United States Patent [19]

Cross et al.

[11] Patent Number: 5,070,778
[45] Date of Patent: Dec. 10, 1991

[54] JUICE EXTRACTOR HAVING MODIFIED PLUG-FORMING CUTTER

[75] Inventors: Stephen D. Cross, San Jose, Calif.; Guillermo T. Segredo; Paul L. Ballentine, both of Lakeland, Fla.

[73] Assignee: FMC Corporation, Chicago, Ill.

[21] Appl. No.: 446,823

[22] Filed: Dec. 6, 1989

[51] Int. Cl.$^5$ ............................ A23N 1/02; B30B 9/02
[52] U.S. Cl. ........................................ 99/510; 99/509; 100/98 R; 100/108; 100/213
[58] Field of Search ................. 99/495, 509, 510, 513, 99/591, 593; 100/37, 98 R, 108, 213

[56] References Cited

U.S. PATENT DOCUMENTS

| | | | |
|---|---|---|---|
| 2,780,988 | 2/1957 | Belk et al. | 100/108 |
| 2,856,846 | 10/1958 | Belk | 100/108 |
| 3,429,257 | 2/1969 | Belk | 100/108 |
| 4,300,449 | 11/1981 | Segredo | 100/98 R |
| 4,309,943 | 1/1982 | Lorsen et al. | 99/509 |
| 4,376,409 | 3/1983 | Belk | 99/509 |
| 4,700,620 | 10/1987 | Cross | 99/510 |
| 4,922,813 | 5/1990 | Compri | 99/495 |

FOREIGN PATENT DOCUMENTS 806744 10/1936 France .................. 100/108

*Primary Examiner*—Timothy F. Simone
*Attorney, Agent, or Firm*—Douglas W. Rudy; Richard B. Megley

[57] ABSTRACT

Citrus juice extraction equipment is provided with an annular cutter head provided with a plurality of apertures or window means which allow peel oil that is pressed out of plug of citrus fuit rind cut by annular cutter head to pass therethrough and join the rind of citrus fruit which passes adjacent the windows in the annular cutter head when the citrus fruit is being processed to extract citrus juice.

9 Claims, 2 Drawing Sheets

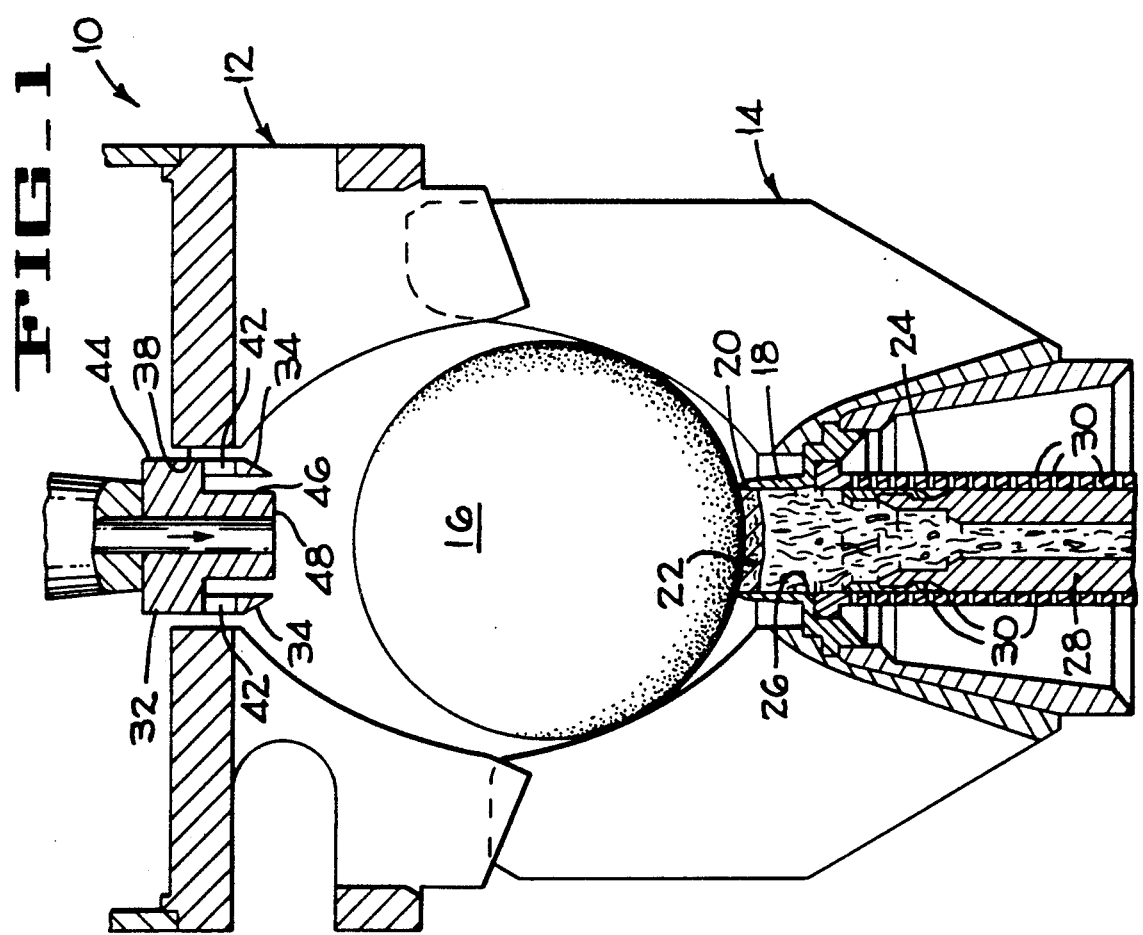
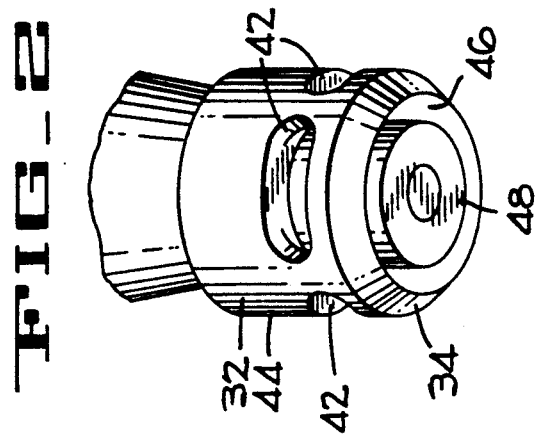

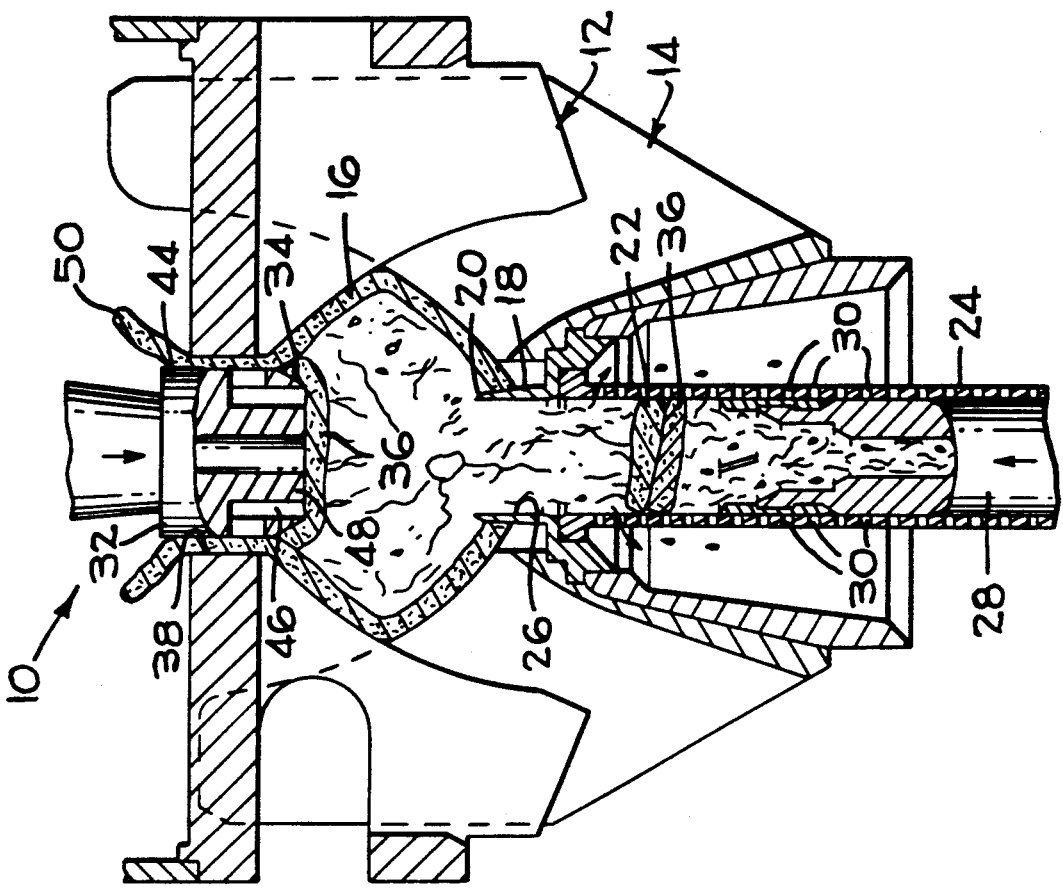
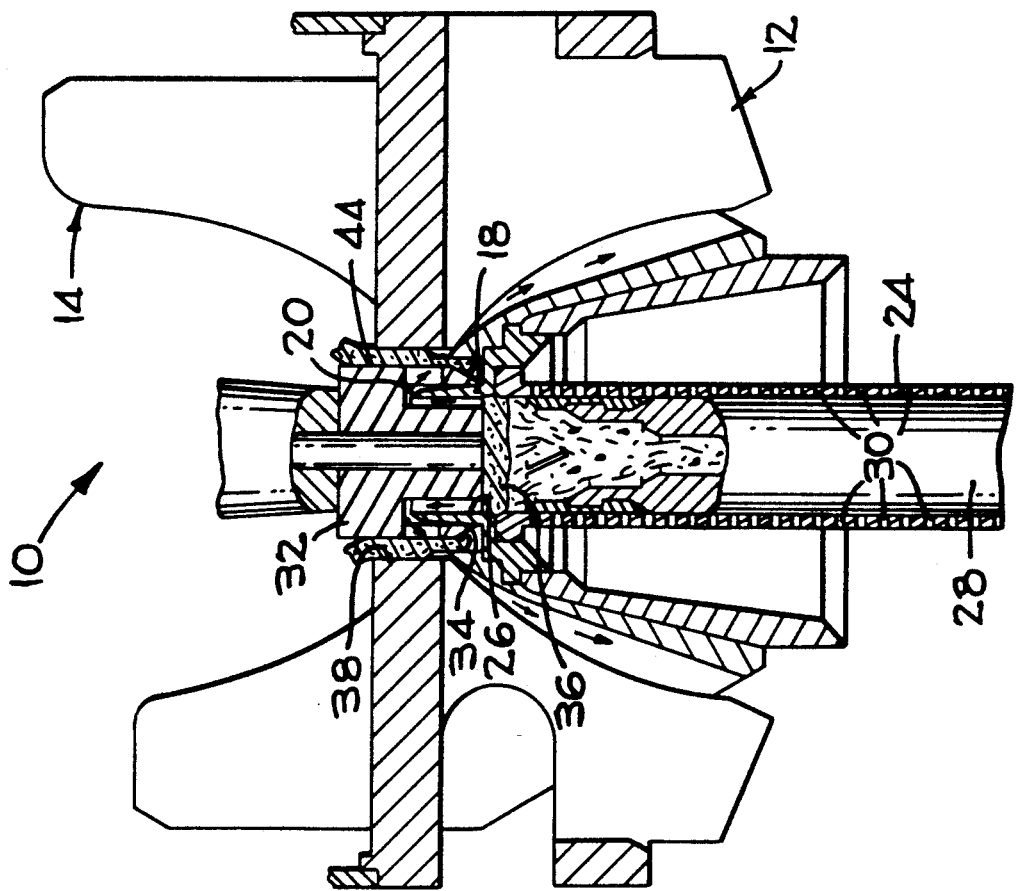

JUICE EXTRACTOR HAVING MODIFIED PLUG-FORMING CUTTER

BACKGROUND OF THE INVENTION

This invention has to do with citrus juice extraction equipment used in juice extraction from citrus fruit such as oranges, grapefruit, limes, lemons and such. It is well known to use interdigitating fruit squeezing cups, upper and lower plug cutters and an orifice tube structure for juice extraction. The invention presented herein is an improvement in this well known method of juice production. U.S. Pat. Nos. 2,780,988 to W. C. Belk, et al., 2,649,730 to J. M. Hait and 4,376,409 to W. C. Belk exemplify the type of juice extractors discussed herein. The improvement provided by this invention is the result of carefully controlled component sizing, clearance selection and modifications to well known components to improve yield of the extractors while decreasing the amount of oil extracted from the fruit peel during juice extraction.

SUMMARY OF THE INVENTION

This invention maintains the yield rate as high as conventional juice extractors while simultaneously decreasing the amount of oil in the extracted juice stream by reducing the plug size of peel plugs cut out of the fruit while sqeezing, by decreasing the beam setting of the orifice tube, by decreasing the diameter of the strainer tube, increasing the diameter of strainer tube perforations, by providing oil escape apertures in the upper cutter and by decreasing peel clearance between the upper cutter and the upper cup.

It has been found that component sizing to produce a decrease in oil extracted from the peel, primarily the reduction in the size of plugs cut in the peel by the upper and lower cutters have lead to a decrease in juice yield from a total quantity perspective. Such a decrease in yield offset the cost advantage of producing a juice stream with lower oil content therefore early attempts to reduce oil content were not as successful as commercially necessary to support production.

Modification to extraction components in contact with the fruit, as presented herein, have resulted in apparatus that has the advantage of reducing oil in the extracted juice stream and increasing the extraction yield of the extractors.

BRIEF DESCRIPTION OF THE DRAWING FIGURES

FIG. 1 is a diagrammatic, fragmentary vertical sectioned view of the fruit contacting portion of an improved fruit juice extractor;

FIG. 2 is an upper cutter having apertures formed therein;

FIG. 3 is an enlarged fragmentary view the apparatus of FIG. 1 with the elements of the juice extractor disposed at an advanced point in time in the juice extracting cycle;

FIG. 4 is an enlarged fragmentary developed view of the juice extractor elements at an advanced point in time in the juice extracting cycle.

DESCRIPTION OF THE PREFERRED EMBODIMENT

The present invention is an improvement in juice extraction equipment of the type described in U.S. Pat. Nos. 2,649,730, 2,780,988 and 4,376,409. Complete details of the basic machine and the manner in which the various components thereof cooperate may be found in the mentioned patents as well is in related patents which have built on the older prior art juice extractor patents mentioned.

With reference to FIG. 1, the structure of the juice extractor which encompasses the present invention will be briefly described. The juice extractor, generally 10, includes an upper cup assembly 12 and a lower cup assembly 14. The lower cup 14 is fixedly attached to a stationary bed plate in a well known manner. The upper cup 12 is affixed to a vertical drive rod (not shown) which reciprocates upwardly and downwardly to interdigitate the fingers of the upper cup with the fingers of the lower cup to squeeze a fruit such as the orange depicted as 16 and thus extract the juice therefrom as taught in the earlier referenced patents.

The lower cup assembly 14 includes a lower cutter assembly which includes an annular cutting knife 18 having a blade portion 20 that cuts a small flat cylindrical plug 22 out of the fruit 16 at the bottom portion thereof when the fruit is forced against the blade. The annular knife 18 is secured to a strainer tube 24 and the tubular inner passage 26 of the annular cutting knife 18 communicates with the strainer tube. Carried inside the strainer tube 24 is a vertically reciprocating orifice tube 28 which is reciprocated in relationship to the reciprocating movement of the upper cup assembly 12. As the orifice tube 28 moves upwardly, the internal portions of the fruit 16, which are forced into the strainer tube 24 by the compressing force of the cup assemblies on the fruit will be placed under a progressively increasing compressive force to extract the juice outwardly through apertures such as 30 in the strainer tube.

The upper cup assembly 12 includes an annular cutter head 32 which includes an annular blade portion 34 at the lower end thereof which is adapted to pierce a small, flat cylindrical plug 36 from the top portion of the fruit 16. The blade 34 is sized to be received in telescoping engagement with the lower blade 20 when the upper and lower cup assemblies, 12 and 14, are brought into interdigitating engagements (FIGS. 3 and 4).

When the upper and lower cup assemblies are brought together and compressive forces are exerted about the entire spherical surface of the fruit 16, the rind of the fruit 16 will be ejected through a narrow annular passageway 38 at the inner edges of the upper cup assembly 12 and the relatively adjacent surface 44 of the upper annular cutter head 32.

The present invention relates to the shape and size of the upper annular cutter head 32 which has been provided with a plurality of apertures, window means or windows 42 therein which allow peel oil that is pressed out of the plugs cut by the upper annular cutter head to enter the stream of rind being ejected during a juicing cycle between the surface 40 of the upper cutter head and the wall portion of the upper cup. It has been found that the windows 42, which can be any type of opening or passage connecting the inner area of cutter with the outer surface of the cutter head, can be formed in a conventional cutter head and thus provide a decrease in peel oil in the juice stream as peel oil from the upper plug is at least partially taken away with the fruit rind.

The window means may be elongated slots or apertures as shown at 42 in FIG. 2 which extend along the circumference 44, of the cutter head and extend into the passage 46 between the blade portion 34 and a central shaft portion 48. Alternatively the window means could be round apertures, square apertures or any other shapes of apertures as long as they provide an opening from the passage to the circumferential outer surface of the cutter head.

Another modification to well known juice extractor components which has been shown to increase yield is providing a downsized strainer tube 24 with increased diameter apertures 30. In a preferred embodiment the strainer tube 24 has an inside diameter of 0.750 inches and apertures in a range of between 0.057 and 0.070 inches with 0.062 inches found to perform well. Earlier attempts at low oil extractors used a strainer tube of 0.750 inch diameter with apertures of 0.042. This was found to be a detriment in juice yield. In earlier extractors, such as those having nominal one inch strainer tubes, it was well known that having strainer tube apertures of 0.062 for instance were not viable as the quality of juice produced with such equipment would be defective due to the high incidence of undesirable products in the juice stream. Such is not the case in the embodiment of the instant invention.

FIGS. 3 and 4 show how the peel oil from the upper plug 36 is partially directed in a direction away from the strainer tube 24 so that the peel oil is not introduced into the juice stream. In FIG. 3 the fruit 16 is partially compressed between the upper 12 and lower 14 cup assemblies. The annular cutting knife 18 has pierced the rind of the fruit and the cylindrical plug 22 has been urged into the strainer tube 24 on top of the top cylindrical plug 36 from the previous fruit squeezing cycle. The upper cutter head 32 has been urged downwardly forcing the central shaft 48 to push a portion of the rind downwardly. The major portion of the rind or peel 50 is seen as being partially extruded through the clearance opening between the outermost circumferential surface 44 of the cutter head and circumferential opening in the upper cutter which forms the narrow passageway 38. The upper plug 36 has not been cut in FIG. 3.

In FIG. 4 the upper plug 36 has been cut out by the blade 20 of the annular cutting knife 18. The blade 20 passes inboard of the edge of blade 34 of the annular cutter head 32 in a well known manner to make a clean cut of the upper plug 36. The rind or peel which is not part of the plug 36 is extruded upwardly through the narrow annular passageway 38.

As the upper plug 36 is subjected to pressure from the central shaft 48 oil in the plug (peel oil) will be forced therefrom and pass in the direction of the small arrows over the blade 20 of the annular cutting knife into the window means 42 and into the small or narrow annular passageway 38 to join with the extracted peel. The peel may be compressed in the passageway 38 and yield peel oil which follows the direction of small arrows into a collection system where the peel oil is collected for further processing.

In early embodiments of this invention it was found that an improvement in reducing the oil content of the main juice stream was at least partially accomplished by the use of the window means in the cutter head. Peel oil from the plug was partially diverted into the oil collection path along with oil from the major portion of the peel. However it was found that overall juice yield decreased. Juice yield has been improved almost to the point of yield experienced prior to the use of the modified cutter head through, among other things, such as strainer tube aperture size, the careful sizing of the cutter head outer diameter to the diameter of the orifice in the upper cup.

In a preferred embodiment it has been found that a ratio of cutter head area to upper cup orifice area should be greater than seventy percent and excellent results have been attained where the ratio is seventy-seven percent where the cutter head diameter is 1.150 inches. One alternative embodiment, where the cutter head diameter is 1.312 inches showed excellent results where the ratio was 80%. The range would extend from approximately sixty-nine percent to some percentage over seventy-seven percent where the peel could still be extruded through the narrow annular passageway 38 without becoming jammed.

Although the best mode contemplated for carrying out the invention has been herein shown and described, it will be apparent that modifications and variations may be made without departing from what is regarded to be the subject matter of the present invention.

What is claimed is:

1. In a juice extractor that compresses a fruit between upper and lower fruit receiving cups having interdigitating fingers, said upper cup having a central orifice, and said juice extractor having an annular cutter head, the improvement comprising;

said annular cutter head having a blade portion and a central shaft portion said blade portion and said central shaft portion defining a passage in said cutter head, and window means connecting said passage with the outermost circumferential surface of said cutter head;

said outermost circumference of said cutter head defining an area greater than seventy percent of the area of said central orifice.

2. The invention in accordance with claim 1 wherein said window means is an elongated aperture extending along said circumference of said annular cutter head.

3. The invention in accordance with claim 1 wherein said window means is an aperture in said annular cutter head extending from the outer surface thereof to said passage.

4. The invention in accordance with claim 3 wherein said window means incorporates more than one aperture.

5. The invention in accordance with claim 1 wherein said strainer tube has an inside diameter of less than one inch and is provided with apertures having diameters in a range from 0.057 to 0.070 inches in diameter.

6. The invention in accordance with claim 5 wherein said strainer tube is provided with apertures having diameters of 0.062 inches.

7. The invention in accordance with claim 1 wherein said juice extractor further comprises a strainer tube having an inside diameter of 0.750 inches.

8. The invention in accordance with claim 7 wherein said strainer tube is provided with apertures having diameters in a range from 0.057 to 0.070 inches in diameter.

9. The invention in accordance with claim 7 wherein said strainer tube is provided with apertures having diameters of 0.062 inches.

* * * * *